(12) United States Patent
Bauco

(10) Patent No.: US 7,489,437 B1
(45) Date of Patent: Feb. 10, 2009

(54) FIBER LASER RED-GREEN-BLUE (RGB) LIGHT SOURCE

(75) Inventor: Anthony Sebastian Bauco, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 25 days.

(21) Appl. No.: 11/999,322

(22) Filed: Dec. 5, 2007

(51) Int. Cl.
 *G02F 2/02* (2006.01)
 *H01S 3/10* (2006.01)

(52) U.S. Cl. .................. 359/326; 359/328; 359/330; 372/22; 372/23

(58) Field of Classification Search ......... 359/326–332; 372/21–23, 6
See application file for complete search history.

(56) References Cited

U.S. PATENT DOCUMENTS

| | | | |
|---|---|---|---|
| 5,253,073 A | 10/1993 | Crowley | 358/231 |
| 5,317,348 A | 5/1994 | Knize | 353/31 |
| 5,388,114 A | 2/1995 | Zarrabi et al. | 372/22 |
| 5,434,875 A | 7/1995 | Rieger et al. | 372/25 |
| 5,440,352 A | 8/1995 | Deter et al. | 348/750 |
| 5,485,225 A | 1/1996 | Deter et al. | 348/804 |
| 5,504,602 A | 4/1996 | Farmer | 359/69 |
| 5,802,086 A | 9/1998 | Hargis et al. | 372/22 |
| 5,828,424 A | 10/1998 | Wallenstein | 348/760 |
| 5,956,172 A | 9/1999 | Downing | 358/326 |
| 6,025,885 A | 2/2000 | Deter | 348/661 |
| 6,304,257 B1 | 10/2001 | Viskari | 345/339 |
| 6,480,325 B1 * | 11/2002 | Batchko et al. | 359/330 |
| 6,549,547 B2 | 4/2003 | Galvanauskas et al. | 372/25 |
| 6,594,090 B2 | 7/2003 | Kruschwitz et al. | 359/707 |
| 6,606,332 B1 | 8/2003 | Boscha | 372/42 |
| 6,774,555 B2 | 8/2004 | Nierenberg et al. | 313/481 |
| 6,774,881 B2 | 8/2004 | Karakawa | 345/84 |
| 7,016,103 B2 * | 3/2006 | Paschotta et al. | 359/330 |
| 7,280,567 B2 | 10/2007 | Luo et al. | 372/6 |
| 2001/0010698 A1 * | 8/2001 | Kraenert et al. | 372/23 |
| 2007/0236779 A1 * | 10/2007 | Kung et al. | 359/326 |
| 2008/0075130 A1 * | 3/2008 | Mizuuchi et al. | 372/6 |

FOREIGN PATENT DOCUMENTS

WO WO2006/006701 * 1/2006

* cited by examiner

*Primary Examiner*—Hemang Sanghavi
(74) *Attorney, Agent, or Firm*—Svetlana Z. Short

(57) ABSTRACT

An RGB light source that uses an optical fiber laser to generate a near-infrared (NIR) output light beam, and a wavelength conversion system that receives the output NIR light beam and forms therefrom red, green and blue light beams. The fiber laser includes multiple stages, wherein the first stage includes a solid-state laser to generate an initial NIR light beam. One or more subsequent stages operate to amplify the NIR light beam to form a relatively high-average-power output NIR light beam. Only light from the fiber laser is used to generate the red, green and blue-wavelength output light beams. The wavelength conversion system includes three or fewer non-linear optical (NLO) units. A color display that utilizes the RGB light source is also disclosed.

20 Claims, 6 Drawing Sheets

FIBER LASER RED-GREEN-BLUE (RGB) LIGHT SOURCE

FIELD OF THE INVENTION

The present invention relates generally to fiber lasers, and in particular relates to a fiber laser-based red-green-blue (RGB) light source.

BACKGROUND OF THE INVENTION

The red, green and blue (RGB) color model involves combining different proportions of red, blue and green light to produce other colors. This model is used in many different types of color displays, such as cathode-ray-tube monitors, liquid crystal displays, and plasma-based displays. In the typical color display, each pixel is configured to combine varying amounts of red, green and blue to create a wide range of colors. The 1931 CIE color space, created by the International Commission on Illumination in 1931, is a useful and convenient way to determine the range of colors available based on specific red, blue and green wavelengths. An example set of RGB wavelengths is $\lambda_R$=630 nm, $\lambda_G$=532 nm and $\lambda_B$=465 nm, respectively.

Each type of color display uses some kind of light source to generate red, blue and green light. Such light sources include, for example, high-intensity discharge (HID) lamps used in combination with red, green and blue filters; separate red, blue and green lasers (e.g., laser diodes); and one or more lasers where the laser light is converted to different wavelengths via non-linear effects.

Non-laser-based RGB sources have several shortcomings, including lack of directionality, relatively low brightness, and relatively low conversion efficiency due to their broad spectral band. Also, such broad-band (i.e., "white light") sources are limited by a flat power vs. wavelength curve. If one tries to use extreme wavelengths on the red or blue end of the spectrum to obtain good color map coverage, a great deal of light in the middle of the spectrum needs to be thrown away to achieve a proper tint. This translates into poor wall-plug efficiency. Conversion efficiency can be improved, but at the expense of color map coverage, which means fewer available colors for the display.

Laser-based RGB sources can have high-directionality and relatively high brightness, but typically require a large laser or a number of different lasers. For those laser-based RGB light sources that include one or two lasers, the designs are relatively complex and non-compact. In particular, for those laser-based RGB light sources that use non-linear optical elements (i.e., non-linear crystals), it is important for cost reduction, compactness and overall commercial viability to reduce the number of lasers and non-linear elements.

SUMMARY OF THE INVENTION

A first aspect of the invention is red-green-blue (RGB) light source that includes an optical fiber laser configured to emit a near-infrared (NIR) light beam. A wavelength conversion system is optically coupled to the optical fiber laser and has three or fewer non-linear optical (NLO) crystals. The wavelength conversion system is configured to receive the NIR light beam and create therefrom red-, green- and blue-wavelength light beams BR, BG and BB using only single-wavelength light originating from the NIR light beam.

A second aspect of the invention is a RGB light source that includes an optical fiber laser configured to output a NIR output light beam BN. A wavelength conversion system is optically coupled to the fiber laser and includes a first NLO unit adapted to receive NIR light beam BN and perform second harmonic generation (SHG) thereon so as to create a green-wavelength light beam BG. The wavelength conversion system also includes a second NLO unit configured to receive at least a portion of light beam BG and create therefrom a red-wavelength light beam BR and a mid-infrared (MIR) light beam BM. The wavelength conversion system also includes a third NLO unit configured to receive at least a portion of light beam BG and at least a portion of light beam BM and form therefrom a blue-wavelength light beam BB.

A third aspect of the invention is a method of producing red wavelength, green wavelength and blue wavelength light beams BR, BG and BB. The method includes forming a NIR light beam BN using an optical fiber laser, and converting light from the NIR light beam to the red, green and blue light beams BR, BG and BB using no more than three non-linear crystals and using only light originating from the NIR light beam BN.

A fourth aspect of the invention is a color display apparatus that includes the RBG light source of the present invention as described briefly above, an optical system adapted to receive and process the red-, green- and blue-wavelength light beams from the RGB light source and form therefrom a display light beam, and a display screen adapted to receive the display light beam and form therefrom a color display image.

It is to be understood that both the foregoing general description and the following detailed description present example embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention and together with the description serve to explain the principles and operations of the invention.

DETAILED DESCRIPTION OF THE INVENTION

Figure 1A:
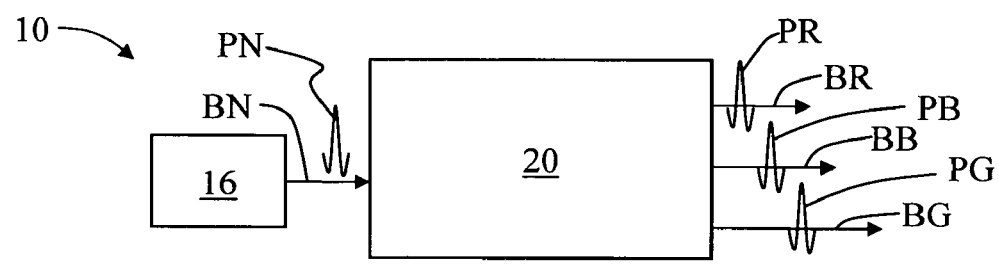
FIG. 1A is a schematic diagram of a generalized embodiment of the fiber-laser RGB light source ("FL-RGB source") according to the present invention.

Reference is now made in detail to the present preferred embodiments of the invention, examples of which are illustrated in the accompanying drawings. Whenever possible, like or similar reference numerals are used throughout the drawings to refer to like or similar parts. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

GENERALIZED EMBODIMENT

FIG. 1A is schematic diagram of a generalized embodiment of a fiber-laser RGB light source ("FL-RGB source") 10 according to the present invention. FL-RGB source 10 includes a fiber laser 16 optically coupled to a wavelength conversion system 20 having an input end 20I and an output end 20O. Fiber laser 16 outputs a light beam BN having a near-infrared (NIR) wavelength $\lambda_N$. In an example embodiment, NIR light beam BN has a wavelength $\lambda_N$=1036 nm. Also in an example embodiment, light beam BN is made up of NIR light pulses PN (i.e., in the case where fiber laser 16 is a pulsed light source). Example embodiments of fiber laser 16 are discussed in greater detail below.

Wavelength conversion system 20 is adapted to receive at input end 20I NIR light beam BN from fiber laser 16 and generate therefrom red ($\lambda_R$), green ($\lambda_G$) and blue ($\lambda_B$) output beams BR, BG and BB, respectively, at output end 20O. In an example embodiment, only light originating from NIR output beam BN is used to form the red-, green- and blue-wavelength light beams BR, BG and BB. That is to say, FL-RGB source 10 does not utilize any other light source besides fiber laser 16 to create light beams BR, BG and BB.

In an example embodiment, fiber laser 16 is a pulsed laser, and beams BR, BG and BB are made up of respective red, green and blue optical pulses PR, PG and PB. If beams BR, BG and BB can have less average power, then in an example embodiment fiber laser 16 can be a continuous-wave (CW) laser rather than a pulsed laser.

Example Single

Crystal Embodiment

Figure 1B:
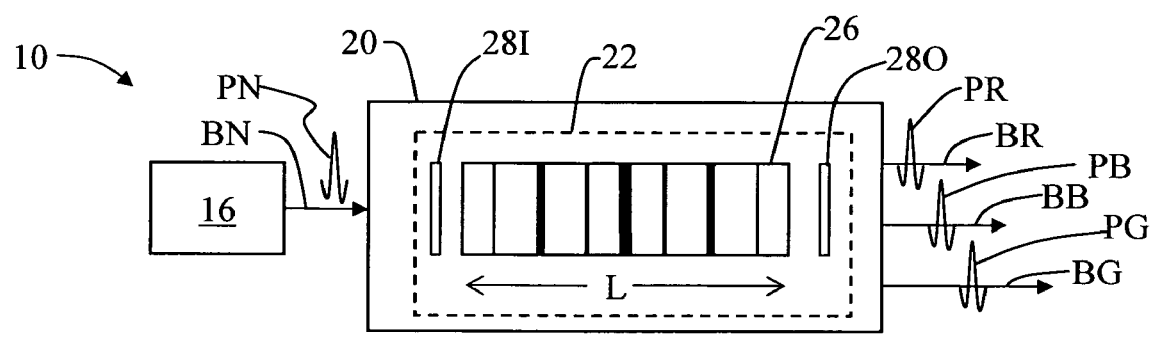
FIG. 1B is a schematic diagram of an example embodiment of a "single crystal" FL-RGB source, wherein the wavelength conversion system includes a single non-linear optics (NLO) unit.

FIG. 1B is a schematic diagram of an example embodiment of a "single crystal" FL-RGB source 10, wherein wavelength conversion system 20 includes a single NLO unit 22. In an example embodiment, NLO unit 22 includes a single crystal, and in particular consists of an optical parametric oscillator (OPO) having a single periodically poled crystal 26 surrounded at its input and output ends by respective input and output end-mirrors 28I and 28O. Crystal 26 has a poling pattern that contains three poling spatial periods that result in the generation of RGB wavelengths $\lambda_R$, $\lambda_G$ and $\lambda_B$, in analogy to a time signal being a sum of three sinusoidal time signals. Also generated in the non-linear optical process in the OPO is mid-infrared (MIR) light of wavelength $\lambda_M$. In an example embodiment, $\lambda_M$=3284 nm.

In this single-crystal example embodiment, input end-mirror 28I mirror is antireflection (AR) coated at $\lambda_N$ (e.g., $\lambda_N$=1036 nm) and high-reflection (HR) coated at $\lambda_R$, $\lambda_G$, $\lambda_B$ and $\lambda_M$ (e.g., 615 nm, 518 nm, 447 nm and 3284 nm, respectively). Likewise, output end-mirror 28O is HR coated at $\lambda_N$ and $\lambda_M$ (e.g., $\lambda_N$=1036 nm and $\lambda_M$=3284 nm), and AR coated at $\lambda_R$, $\lambda_G$ and $\lambda_B$ (e.g., 615 nm, 518 nm and 447 nm, respectively). Proper selection of the crystal length L and the relative amplitudes of the three poling spatial frequencies and phases results in the appropriate relative average power levels out of the OPO for beams BR, BG and BB at $\lambda_R$, $\lambda_G$ and $\lambda_B$ (e.g., 615 nm, 518 nm, and 447 nm, respectively).

Note that in the single-crystal embodiment of FL-RGB source 10, only light originating from NIR output beam BN is used to form the red-, green- and blue-wavelength light beams BR, BG and BB.

Example Two

Crystal Embodiment

Figure 2A:
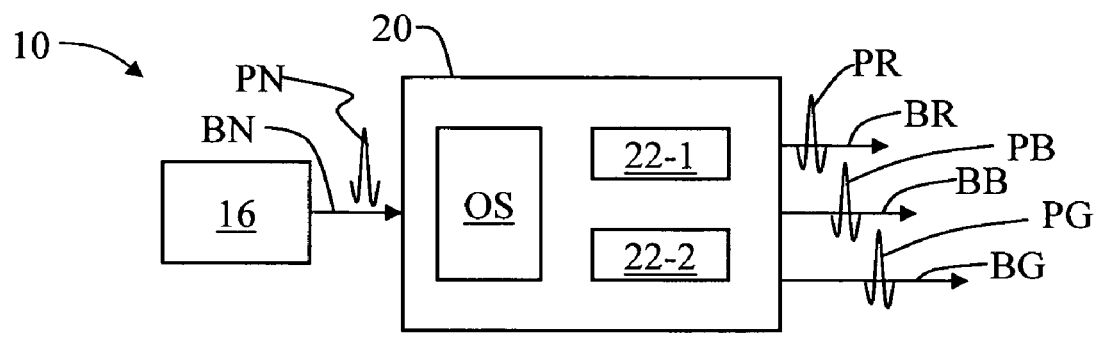
FIG. 2A is a schematic diagram of an example embodiment of a "two crystal" FL-RGB source, wherein the wavelength conversion system includes an optical system and two NLO units.

FIG. 2A is a schematic diagram illustrating an example embodiment of a "two crystal" FL-RGB source 10, wherein wavelength conversion system 20 includes an optical system OS and two non-linear optical (NLO) units 22-1 and 22-2. The two NLO units 22-1 and 22-2 are operably arranged relative to optical system OS to receive NIR light beam BN and generate therefrom red, green and blue output beams BR, BG and BB made up of respective light pulses PR, PG and PB. In an example embodiment, optical system OS is configured relative to the first and second NLO units 22-1 and 22-2 so as to provide an optical path over which only light originating from NIR output beam BN is used to form the red-, green- and blue-wavelength light beams BR, BG and BB. That is to say, FL-RGB source 10 does not utilize any other light source besides that from fiber laser 16 to create light beams BR, BG and BB.

Figure 3A:
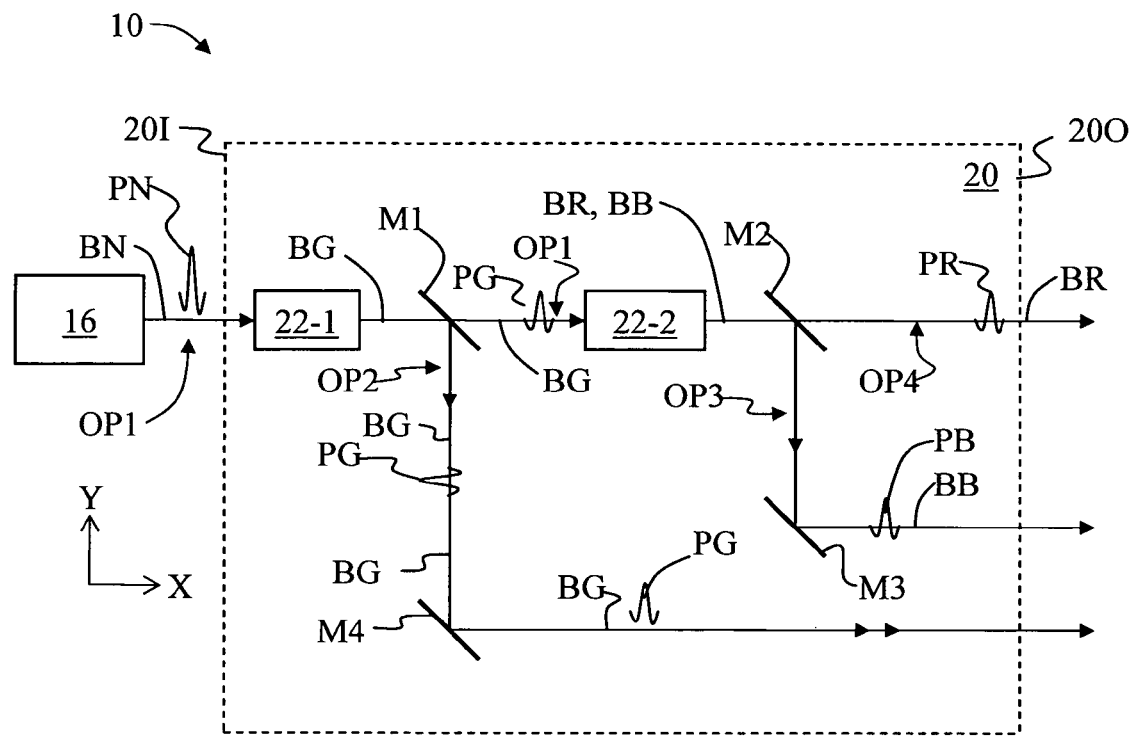
FIG. 3A is a detailed schematic diagram of an example embodiment of the two-crystal FL-RGB source of FIG. 2A.

FIG. 3A is a more detailed schematic diagram illustrating an example embodiment of the "two crystal" wavelength conversion system 20 of FIG. 2A that uses a two-step wavelength conversion method. FIG. 3A includes X-Y Cartesian coordinates for the sake of reference. NIR light beam BN is emitted from fiber laser 16 along a first optical path OP1 in the X-direction and enters wavelength conversion system 20 at input end 20I. Optical system OS includes one or more mirrors, e.g., mirrors M1, M2, M3 and M4. Mirror M1 is partially transmitting/reflecting and thus serves as a beam splitter operative at green wavelength $\lambda_G$. Mirror M1 creates a second optical path OP2 orthogonal to optical path OP1 and in the −Y direction. Optical path OP2 leads to mirror M4, discussed below.

Arranged downstream of mirror M1 along optical path OP1 in the X-direction is mirror M2. Mirror M2 is dichroic and is configured to transmit red wavelength $\lambda_R$ and reflect a blue wavelength $\lambda_B$, such as $\lambda_B$=447 nm. Mirror M2 forms an optical path OP3 in the −Y direction and that is orthogonal to optical path OP2. The blue light is reflected from mirror M2 to travel down optical path OP3. Arranged along optical path OP3 downstream of mirror M2 is mirror M3. Mirror M3 is reflective and configured to reflect blue wavelength $\lambda_B$ out of the system in the X-direction.

Mirror M4 is reflective and is arranged along optical path OP2 downstream from mirror M1. Mirror M4 reflects green wavelength $\lambda_G$ out of the system along X.

With continuing reference to FIG. 3A, first NLO unit 22-1 is configured to perform second-harmonic generation (SHG). NLO unit 22-1 is arranged adjacent to and upstream of mirror M1 along optical path OP1 and receives NIR beam BN (and thus pulses PN therein) from fiber laser 16. In an example embodiment, NLO unit 22-1 includes either a non-linear optical crystal, such as Lithium Borate (LBO) oriented for phase matching at $\lambda_G$, a periodically poled lithium niobate (PPLN) crystal, or a periodically poled lithium tantalate (PPLT) crystal, wherein the poling period for SHG is for green wavelength $\lambda_G$. In an example embodiment, NIR beam BN has a wavelength $\lambda_M=1036$ nm and NLO unit 22-1 performs SHG on the NIR beam to create light beam BG having light pulses PG with a green wavelength $\lambda_G=518$ nm.

A portion of green light beam BG is reflected by mirror M1 and travels down optical path OP2 to mirror M4, which reflects this light so that it exits wavelength conversion system 20 at output end 20O, thus providing the green output beam BG.

Second NLO unit 22-2 is arranged in optical path OP1 between mirrors M1 and M2 and so receives the portion of green light beam BG transmitted by mirror M1. NLO unit 22-2 is configured to perform both OPO and sum-frequency mixing (SFM), wherein a portion of the relatively high-energy photons in green light beam BG is converted to two lower energy photons of wavelength $\lambda_R$ and $\lambda_M$ that constitute respective red-wavelength and MIR-wavelength light beams. The remaining portion of the green-wavelength photons are then sum-frequency mixed with the MIR photons to create blue-wavelength ($\lambda_B$) photons. In the example embodiment wherein $\lambda_G=518$ nm, second NLO unit 22-2 creates a red-wavelength light beam BR having a wavelength $\lambda_R=615$ nm and an MIR light beam BM having a wavelength $\lambda_M=3284$ nm. Red light beam BR passes through the output mirror of the OPO, through mirror M2, and is outputted from wavelength conversion system 20 at output end 20O, thus providing the red output beam BR.

Figure 3B:
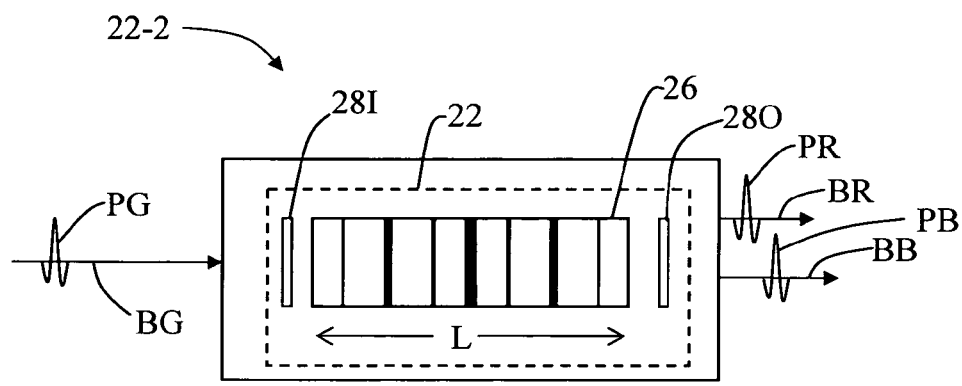
FIG. 3B is a schematic diagram of an example embodiment of the second NLO unit of the FL-RGB source of FIG. 3A, wherein the second NLO unit includes an optical parametric oscillator (OPO)

With reference to FIG. 3B, in an example embodiment, second NLO unit 22-2 includes an OPO 30 with internal sum frequency mixing by having a periodically poled crystal 26 surrounded by input and output end-mirrors 28I and 28O, similar to the OPO shown in FIG. 1B. In the second NLO unit 22-2, crystal 26 has a dual poling period that is phase matched to $\lambda_G$, $\lambda_R$ and $\lambda_M$ (e.g., $\lambda_G=518$ nm, $\lambda_R=615$ nm and $\lambda_M=3284$ nm) for OPO and phase matched to $\lambda_G$, $\lambda_B$ and $\lambda_M$ (e.g., $\lambda_G=518$ nm, $\lambda_B=447$ nm and $\lambda_M=3284$ nm) for SFM. In an example embodiment, OPO 30 is configured to be singly resonant at an MIR idler wavelength $\lambda_M$, e.g., $\lambda_M=3284$ nm. Also in an example embodiment, input end-mirror 28I is antireflection (AR) coated at $\lambda_G=518$ nm and high-reflection (HR) coated at $\lambda_R=615$ nm, $\lambda_B=447$ nm and at $\lambda_M=3285$ nm, while output end-mirror 28O is AR coated at $\lambda_R=615$ nm and $\lambda_B=447$ nm, is high-reflection (HR) coated at $\lambda_M=3284$ nm and $\lambda_G=518$ nm.

For each pair of photons of wavelength $\lambda_G$ and $\lambda_M$ within the second NLO unit 22-2, a blue-wavelength photon of wavelength $\lambda_B$ is produced via SFM, thereby generating blue-wavelength beam BB. This light beam travels along optical path OP3, where it is reflected by mirror M3 and out of output end 20O of wavelength conversion system 20, thereby providing blue output beam BB. In the example embodiment wherein green light beam BG has a wavelength $\lambda_G=518$ nm and MIR light beam BM has a wavelength $\lambda_M$, SFM creates a blue light beam BB having a wavelength $\lambda_B=447$ nm.

Also, in an example embodiment, mirror M1 is configured to provide a select amount of reflection and/or transmission so that the proper relative intensities of the green light beam is provided to the second NLO unit 22-2. In an example embodiment, mirror M1 has a reflectivity $R_1$ at $\lambda_G=518$ nm of $R_1=17\%$ and transmission $T_1=83\%$. Thus, where green light beam BG has an initial average power $P_G=17.7$ W incident on mirror M1, this power is divided into $P_G=14.7$ W in beam BG heading to the second NLO unit 22-2 along optical path OP1, and $P_G=3$ W heading to mirror M4 along optical path OP2.

In an example embodiment, the 14.7 W of power $P_G$ in beam BG provided to second NLO unit 22-2 generates an average power $P_R=4.1$ W in the resulting red beam BR that passes through mirror M2 and that is outputted at output end 22O.

The second NLO unit 22-2 also generates, from the two beams BM and BG, the blue-wavelength output light beam BB having an average power $P_B=2.2$ W. The average powers $P_R=4.1$ W, $P_G=3$ W and PB=2.2 W in output beams BR, BG and BB correlate to the color sensitivity of the human eye.

In an example embodiment, the optical path lengths OP in optical system OS are adjusted to ensure that output beams (pulses) BR, BG and BB are synchronized. In an example embodiment, at least one of mirrors M1 through M5 are adjustable (e.g., moveable) to control the synchronization of the various light pulses within wavelength conversion system 20.

Example Three

Crystal Embodiment

Figure 2B:
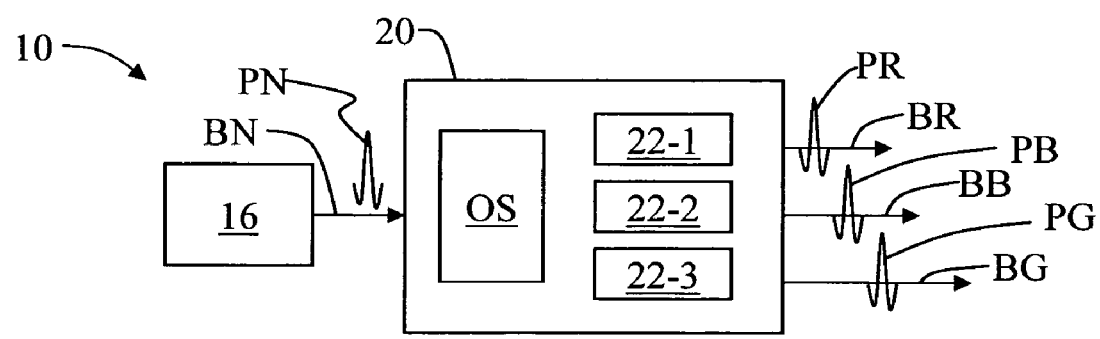
FIG. 2B is a schematic diagram of an example embodiment of a "three crystal" FL-RGB source, wherein the wavelength conversion system includes an optical system and three NLO units.

FIG. 2B is a schematic diagram illustrating an example embodiment of a "three crystal" FL-RGB source 10, wherein wavelength conversion system 20 includes an optical system OS and three NLO units 22-1, 22-2 and 22-3. The three NLO units 22-1, 22-2 and 22-3 are operably arranged relative to optical system OS to receive NIR light beam BN and generate therefrom red, green and blue output beams BR, BG and BB made up of respective light pulses PR, PG and PB. In an example embodiment, optical system OS is configured relative to the first, second and third NLO units 22-1, 22-2 and 22-3 so as to provide an optical path over which only light originating from NIR output beam BN is used to form the red-, green- and blue-wavelength light beams BR, BG and BB. That is to say, FL-RGB source 10 does not utilize any other light source besides that from fiber laser 16 to create light beams BR, BG and BB.

Figure 4A:
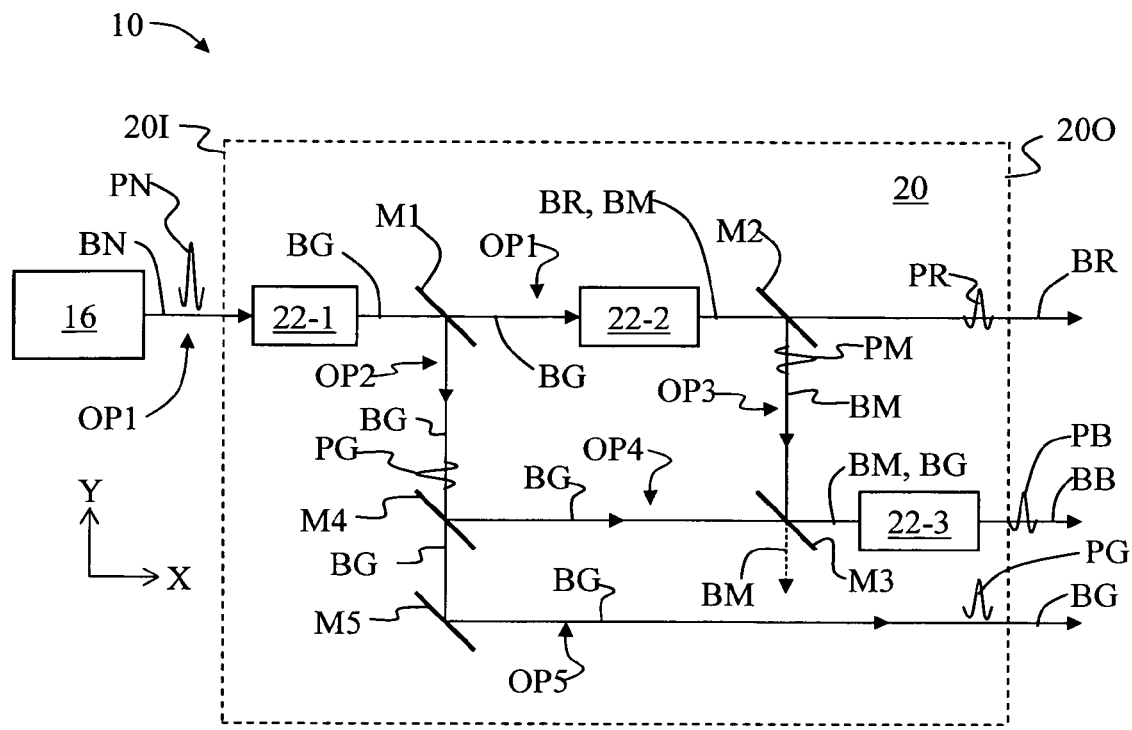
FIG. 4A is a detailed schematic diagram of an example embodiment of the three-crystal FL-RGB source of FIG. 2B.

FIG. 4A is a more detailed schematic diagram illustrating an example embodiment of the "three crystal" wavelength conversion system 20 of FIG. 2B that uses a three-step wavelength conversion method. FIG. 4A includes X-Y Cartesian coordinates for the sake of reference. NIR light beam BN is emitted from fiber laser 16 along a first optical path OP1 in the X-direction and enters wavelength conversion system 20 at input end 20I. Optical system OS includes one or more mirrors, e.g., mirrors M1, M2, M3 and M4 arranged in order clockwise at the corners of an imaginary rectangle in the X-Y plane. Mirror M1 is partially transmitting/reflecting and thus serves as a beam splitter operative at green wavelength $\lambda_G$. Mirror M1 creates a second optical path OP2 orthogonal to optical path OP1 and in the −Y direction. Optical path OP2 leads to mirror M4, discussed below.

Arranged downstream of mirror M1 along optical path OP1 in the X-direction is mirror M2. Mirror M2 is dichroic and is configured to transmit red wavelength $\lambda_R$ and reflect a mid-IR (MIR) wavelength $\lambda_M$, such as $\lambda_M$=3284 nm. Mirror M2 forms an optical path OP3 in the –X direction and that is parallel to optical path OP2. The MIR light is reflected from mirror M2 to travel down optical path OP3. Arranged along optical path OP3 downstream of mirror M2 is mirror M3. Mirror M3 is dichroic and configured to transmit green wavelength $\lambda_G$ and reflect MIR wavelength $\lambda_M$. Mirror M3 forms an optical path OP4 that runs in the X-direction and is parallel to optical path OP1. The MIR wavelength light is reflected by mirror M3 to travel along optical path OP4.

Mirror M4 is partially transmitting/reflecting and is arranged along optical path OP2 downstream from mirror M1. Mirror M4 serves as a beam splitter that operates at green wavelength $\lambda_G$ and that reflects green wavelength $\lambda_G$ along optical path OP4 in the X-direction toward mirror M3.

Optical system OS optionally includes a mirror M5 arranged downstream of mirror M4 along optical path OP2 in the –Y direction. Mirror M5 is configured to reflect green wavelength $\lambda_G$ along a fifth optical path that is parallel to optical paths OP1 and OP4 and that runs in the X-direction so that the red-, green- and blue-wavelength beams BR, BG, BB have a common output location and direction at wavelength conversion system output end 20O.

With continuing reference to FIG. 4A, first NLO unit 22-1 is configured to perform second-harmonic generation (SHG). NLO unit 22-1 is arranged adjacent to and upstream of mirror M1 along optical path OP1 and receives NIR beam BN (and thus pulses PN therein) from fiber laser 16. In an example embodiment, NLO unit 22-1 includes either a non-linear optical crystal, such as Lithium Borate (LBO) oriented for phase matching at $\lambda_G$, a periodically poled lithium niobate (PPLN) crystal, or a periodically poled lithium tantalate (PPLT) crystal, wherein the poling period for SHG is for green wavelength $\lambda_G$. In an example embodiment, NIR beam BN has a wavelength $\lambda_M$=1036 nm and NLO unit 22-1 performs SHG on the NIR beam to create light beam BG having light pulses PG with a green wavelength $\lambda_G$=518 nm.

A portion of green light beam BG is reflected by mirror M1 and travels down optical path OP2 to mirror M4, wherein at least a portion of this beam BG is reflected by mirror M4 to travel down optical path OP4 to mirror M3. In an example embodiment, a portion of light beam BG incident on mirror M4 passes through mirror M4 and travels to mirror M5, which reflects this bream down optical path OP5 so that it exits wavelength conversion system 20 at output end 20O, thus providing the green output beam BG.

Second NLO unit 22-2 is arranged in optical path OP1 between mirrors M1 and M2 and so receives the portion of green light beam BG transmitted by mirror M1. NLO unit 22-2 is configured to perform optical parametric oscillation (OPO), wherein each relatively high-energy photon in green light beam BG is converted to two lower energy photons of wavelength $\lambda_R$ and kM that constitute respective red-wavelength and MIR-wavelength light beams BR and BM. In the example embodiment wherein $\lambda_G$=518 nm, second NLO unit 22-2 creates a red-wavelength light beam BR having a wavelength $\lambda_R$=615 nm and an MIR light beam BM having a wavelength $\lambda_M$=3284 nm. Red light beam BR passes through dichroic mirror M2 and is outputted from wavelength conversion system 20 at output end 20O, thus providing the red output beam BR.

Figure 4B:
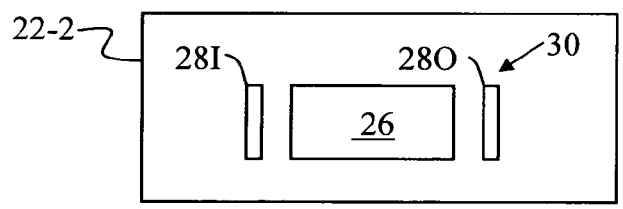
FIG. 4B is a schematic diagram of an example embodiment of second NLO unit of the FL-RGB source of FIG. 4A, wherein the second NLO unit includes OPO.

With reference to FIG. 4B, in an example embodiment, second NLO unit 22-2 includes an OPO 30 having a periodically poled crystal 26 surrounded by input and output end-mirrors 28I and 28O, similar to the OPO shown in FIG. 1B. In OPO 30, crystal 26 has a poling period phase matched to $\lambda_G$, $\lambda_R$ and $\lambda_M$ (e.g., $\lambda_G$=518 nm, $\lambda_R$=615 nm and $\lambda_M$=3284 nm). In an example embodiment, OPO 30 is configured to be singly resonant at an MIR idler wavelength $\lambda_M$, e.g., $\lambda_M$=3284 nm. Also in an example embodiment, input end-mirror 28I is AR coated at $\lambda_G$=518 nm and HR coated at $\lambda_R$=615 nm and at $\lambda_M$=3285 nm, while output end-mirror 28O is AR coated at $\lambda_R$=615 nm, is partially reflecting at $\lambda_M$=3284 nm, and is HR coated at $\lambda_G$=518 nm.

With reference again to FIG. 4A, third NLO unit 22-3 is arranged in optical path OP4 downstream of mirror M3 in the X-direction. Third NLO unit 22-3 is configured to perform sum-frequency mixing. Third NLO unit 22-3 receives green-wavelength photons from green light beam BG reflected by mirrors M1 and M4 and that travel along optical path OP4 where they are transmitted by dichroic mirror M3. Third NLO unit 22-3 also receives MIR-wavelength photons from MIR light beam BM that originate at second NLO unit 22-2 and that are reflected by mirrors M2 and M4 so that they travel along optical path OP4 to third NLO unit 22-3.

For each pair of photons of wavelength $\lambda_G$ and $\lambda_M$ received by third NLO unit 22-3, a blue-wavelength photon of wavelength $\lambda_B$ is produced via SFM, thereby generating blue-wavelength beam BB that travels along optical path OP4 and out of output end 20O of wavelength conversion system 20, thereby providing blue output beam BB. In the example embodiment wherein green light beam BG has a wavelength $\lambda_G$=518 nm and MIR light beam BM has a wavelength $\lambda_M$, third NLO unit 22-2 creates a blue light beam BB having a wavelength $\lambda_B$=447 nm. In an example embodiment, third NLO unit 22-3 includes a periodically poled crystal with a poling period to phase-match $\lambda_G$=518 nm, $\lambda_M$=3284 nm and $\lambda_B$=447 nm.

In FL-RGB source 10, the conversion process is sequential and makes use of each wavelength of light produced to generate the red-, green- and blue-wavelength light beams BR, BG, and BB. The optical path lengths OP in optical system OS are adjusted to ensure the MIR optical pulses PM of wavelength $\lambda_M$=3284 nm generated by second NLO unit 22-2, and green optical pulses PG in green beam BG generated by first NLO unit 22-1 are aligned in time (i.e., are synchronized) when they reach NLO unit 22-3. In an example embodiment, at least one of mirrors M1 through M5 are adjustable (e.g., moveable) to control the synchronization of the various light pulses within wavelength conversion system 20.

Also, in an example embodiment, mirrors M1-M5 are configured to provide select amounts of reflection and/or transmission so that the proper relative intensities of the various light beams are provided to the corresponding NLO units. In an example embodiment, mirror M1 has a reflectivity $R_1$ and a transmission $T_1$ at $\lambda_G$=518 nm of $R_1$=44.6% and $T_1$=53.4%. Thus, where green light beam BG has an initial average power $P_G$=17.7 W incident on mirror M1, this power is divided into $P_G$=9.8 W in beam BG heading to second NLO unit 22-2 along optical path OP1, and $P_G$=7.9 W heading to mirror M4 along optical path OP2.

Also in an example embodiment, mirror M4 has a reflectivity $R_4$ of 62% and a transmission $T_4$ of 38%. Thus, the 7.9 W in green light beam B2 traveling along optical path OP2 is reflected by mirror M4 so that 4.9 W of this beam BG travels along optical path P4 while 3 W travels to mirror M5. In an example embodiment, mirror M5 has a reflectivity $R_5$=100% so that output beam BG at output end 20O has an average power $P_G$=3 W.

In an example embodiment, the 9.8 W of power $P_G$ in beam BG provided to second NLO unit 22-2 generates an average power $P_R$=4.1 W in the resulting red beam BR that passes through mirror M2 and that is outputted at output end 22O.

Also, MIR beam BM formed by second NLO unit 22-2 has an average power $P_M$=0.8 W. Beam BM is preferably 100% reflected by mirrors M2 and M3 so as to be combined with the green beam BG (with $P_G$=4.9 W) that travels along optical path OP4 and through mirror M3 to third NLO unit 22-3. Third NLO unit 22-3 generates from these two beams BM and BG the blue-wavelength output light beam BB having an average power $P_B$=2.2 W. The average powers $P_R$=4.1 W, $P_G$=3 W and PB=2.2 W in output beams BR, BG and BB correlate to the color sensitivity of the human eye.

Example Fiber Laser

Figure 5:
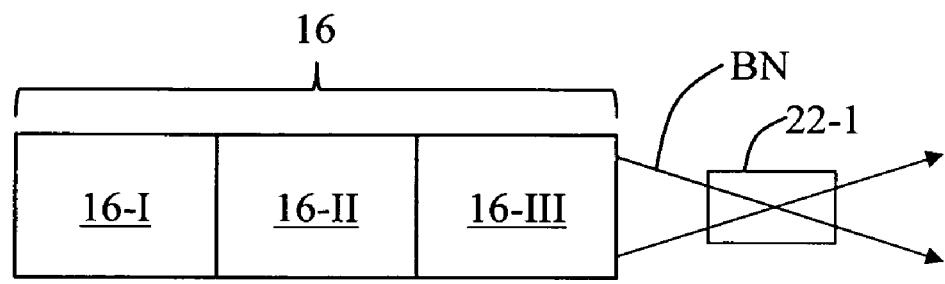
FIG. 5 is a generalized schematic diagram of an example embodiment of the multistage optical fiber laser used in the FL-RGB source of the present invention.

In an example embodiment, fiber laser 16 is made of multiple stages in order to produce a relatively high average power NIR beam BN, i.e., up to about 30 W. FIG. 5 is a schematic diagram of an example embodiment of a multistage fiber laser 16 that includes three optically coupled stages 16-I, 16-II and 16-III, wherein NIR beam BN is emitted from stage 16-III. In an example embodiment, stage 16-I includes a gain-switched semiconductor laser lasing at 1036 nm, stage 16-II includes a Yb-doped fiber amplifier or a mode-locked Yb doped fiber laser, and stage 16-III includes a Yb-doped fiber amplifier.

First Stage

Figure 6A:
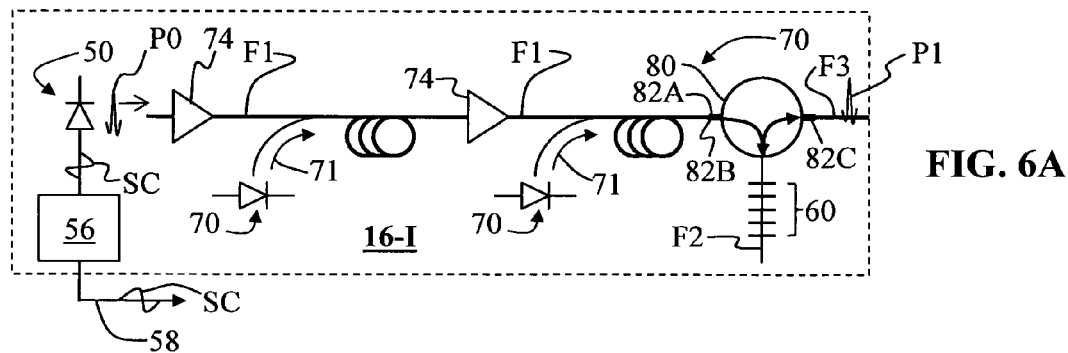
FIG. 6A is a detailed schematic diagram of an example embodiment of the first stage of the fiber laser of FIG. 5.

FIG. 6A is a detailed schematic diagram of an example embodiment of stage 16-I that serves as a master oscillator for fiber laser 16. Stage 16-I includes a semiconductor diode laser 50 lasing at a near-IR wavelength, e.g., $\lambda_{50}$=1036 nm. Laser diode 50 is electrically connected to a clock source 56 that generates a sinusoidal clock signal SC that gain-switches the laser, causing the laser to generate short optical pulses P0. In an example embodiment, clock signal SC is also provided to an external output 58 and is used to synchronize downstream components (not shown), such as the components of an optical display, to which light source 16 is optically coupled (see FIG. 7, discussed below).

In an example embodiment, stage 16-I includes two gain-doped optical fiber sections F1 arranged end to end, with the upstream fiber section being optically coupled to laser 50. In an example embodiment, gain-doped fiber sections F1 are Yb-doped, single-mode (SM) polarization-maintaining (PM) optical fiber sections. Fiber sections F1 may be single-clad or double clad. Upstream fiber section F1 includes an optical isolator 74 at the fiber end adjacent laser 50 to prevent pump light or other scattered light from reaching laser 50. Fiber-sections F1 are each pumped by respective pump lasers 70 that generate pump light 71. In an example embodiment, pump lasers 70 are single-mode telecommunications-grade pump lasers operating at, for example, a pump wavelength $\lambda_P$=976 nm and respective output powers of 0.08 W and 0.37 W. A downstream optical isolator 74 optically isolates the two amplifier sections defined by the two fiber sections F1.

In an example embodiment, stage 16-I also includes an optical circulator 80 with three ports 82A, 82B and 82C. Optical circulator 80 is located at the downstream end of the second fiber section F1 and is connected thereto at input port 82A. Circulator port 82B leads to a second fiber section F2 that includes a fiber Bragg grating 60. Fiber Bragg grating 60 at the downstream end of stage 16-I serve to enforce single-frequency operation of this first stage. Circulator port 82C is an output port and leads to a third section of optical fiber F3 that in turn leads to stage 16-II of fiber laser 16.

In an example embodiment, stage 16-I provides about 100× amplification. Thus, in an example embodiment where the average power of pulses P0 from laser 50 is about 0.001 W, the average power of pulses P1 outputted at fiber section F3 at the output end of stage 16-I is about 0.1 W. An advantage of using a gain-switched 1036 nm seed laser for stage 16-I is that it generates short output pulses P1 with a large duty cycle (e.g., from about 100 to about 1000).

Second Stage

Figure 6B:
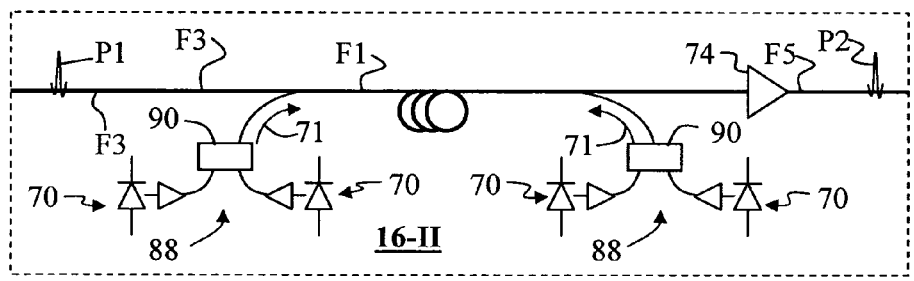
FIG. 6B is a detailed schematic diagram of an example embodiment of the second stage of the fiber laser of FIG. 5.

FIG. 6B is a schematic diagram of an example embodiment of stage 16-II of fiber laser 16. Stage 16-II includes another gained-doped fiber section F1 optically coupled (e.g., fusion spliced) to the output end of fiber section F3. In an example embodiment, fiber section F1 is a Yb-doped, single-mode (SM) polarization-maintaining (PM) optical fiber section. Fiber-section F1 is pumped by two pump stages 88 that each includes two orthogonally polarized pump lasers 70 coupled to a polarization multiplexer 90. Polarization multiplexers 90 combine the polarized pump light from their respective polarized pump lasers 70 to form dual-polarized pump light 71. In an example embodiment, polarized pump lasers 70 provide a combined output pump power of 0.45 W for each pump stage 88. Fiber section F1 of stage 16-II is optically coupled at its output end with a fiber section F5 that includes an optical isolator 74.

In an example embodiment, stage 16-II provides about 10× amplification. Thus, in an example embodiment, stage 16-II receives pulses P1 having an average power of about 0.1 W and creates therefrom an amplified output pulses P2 an average power of ~1 W.

Third Stage

Figure 6C:
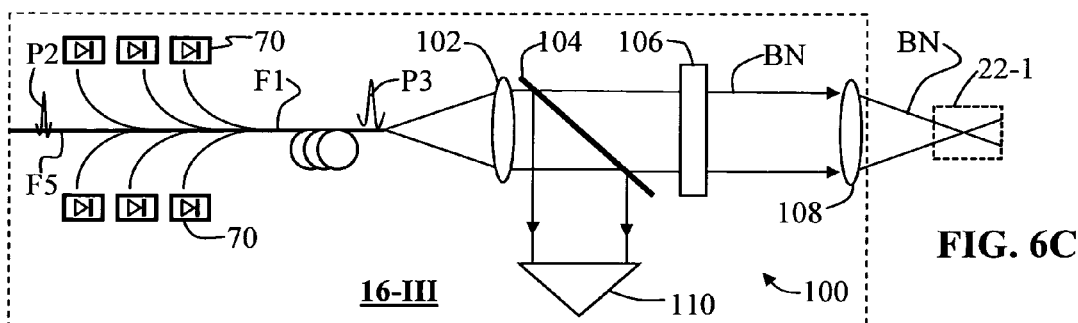
FIG. 6C is a detailed schematic diagram of an example embodiment of the third stage of the fiber laser of FIG. 5.

FIG. 6C is a schematic diagram of an example embodiment of stage 16-III of fiber laser 16. Stage 16-III includes another gain-doped fiber section F1 optically coupled (e.g., fusion spliced) to the output end of fiber section F5. In an example embodiment, fiber section F1 is a Yb-doped, single-mode (SM) polarization-maintaining (PM) optical fiber section. In an example embodiment, optical fiber section F1 of stage 16-III is a double-clad large-mode-area (LMA) fiber configured to avoid non-linear spectral broadening and to suppress Brillouin scattering (SBS). A number of broad-area laser diode pump lasers 70 pumps fiber section F1. In an example embodiment, six pump lasers 70 are used, with each pump laser having a pump power of 6 W.

In an example embodiment, stage 16-III provides about 30× amplification. Thus, in an example embodiment, optical pulses P2 carried from stage 16-II to stage 16-III by fiber section F5 and having an average power of 1 W are amplified to produce NIR output pulses PN having an average power of 30 W at the output end of fiber section F1. Note that the peak powers of optical pulse PN are several hundred times higher than the average power.

Stage 16-III further includes an optical system 100 arranged adjacent to the output end of fiber section F1. Optical system 100 includes, in order from upstream to downstream, a collimating lens 102, a dichroic mirror 104, a bulk-optics optical isolator 106, and a focusing lens 108. The output beam from fiber section F1 is a divergent beam BN. Dichroic mirror 104 is configured to transmit the near-IR wavelength $\lambda_N$ of beam BN while reflecting unconverted pump light 71 of wavelength $\lambda_P$ emitted at the output end of fiber section F1. Collimating lens 102 is located a distance of one focal length away from the output end of fiber section F1 so that it serves to collimate beam BN. The collimated beam BN travels to dichroic mirror 104, which is angled to reflect unconverted pump light 71 to a beam dump 110 while passing beam BN. Collimated beam BN then travels to focusing lens 108, which forms a focused beam BN from collimated beam BN. First NLO unit 22-1 is shown arranged at the focus of beam BN for the sake of illustration.

General Properties of the Fiber Laser

In the example embodiment of staged laser 16 of FIG. 5 and as discussed in FIGS. 6A-6C, optical isolation is used to avoid parasitic lasing, and narrowband spectral filtering is used to remove unwanted amplified spontaneous emission (ASE). In an example embodiment, this is accomplished via optical circulators (e.g., circulator 80) and reflective fiber Bragg gratings (e.g., grating 60) provided at the end of (e.g., between) the stages, such as illustrated in FIG. 6A (not shown in FIGS. 6B and 6C).

In an example embodiment of staged fiber laser 16, all of the active and passive fiber sections are polarization-maintaining (PM) so that the resulting output NIR beam BN has a single spatial mode and a single polarization. In an example embodiment, the various components making up the various stages up to the last amplification stage 16-III are assembled using fusion splicing.

In another example embodiment of staged laser 16 of FIG. 5, the gain-switched laser diode 50 discussed of stage 16-I (FIG. 6A) is replaced with a mode-locked diode or a fiber laser. Such lasers can easily produce optical pulses P0 shorter than 10 ps, resulting in very high duty cycles.

In an example embodiment, fiber laser 16 is a pulsed source with an average output power in NIR beam BN of about 30 W. The pulse duty cycle needs to be on the order of 100-1000 to create the necessary peak power levels to achieve high conversion efficiency in wavelength conversion system 20. At these duty cycles, the peak powers are in the range of 3 kW to 30 kW. The duty cycle depends on the type of NLO crystals used in wavelength conversion system 20. PPLN and PPLT crystals require less peak power to achieve good conversion efficiencies. PPLN and PPLT can also operate at average powers of about 30 W, so relatively low duty cycles can be used for these crystal types. If laser damage is an issue, an LBO crystal can be used with higher duty cycles and peak powers.

It may be desirable to use lower duty cycles and peak powers to avoid fiber non-linearities, such as SBS. If high peak powers are used, it may be necessary to use a LMA (e.g., 20 to 25 um diameter) Yb-doped double clad fiber for fiber section F1 in the last amplifier stage 16-III of staged fiber laser 16, as discussed above. If not, smaller mode area (e.g., 5 to 15 um diameter) double clad fibers can be used. The 976 nm pump lasers 70 are preferably used to pump Yb doped fibers F1 to maximize wall-plug efficiency because the quantum defect between 976 nm to 1036 nm is relatively small.

FL-RGB Source Advantages

FL-RGB source 10 is a very efficient and compact source of RGB light. Unlike traditional white-light-based RGB sources, no power is thrown away in unused wavelengths, and the colors do not need to be separated before they can be processed to create an image. In fact, in the preferred embodiment, only light generated by fiber laser 16 is used to create the red-, green- and blue-wavelength light beams BR, BG and BB. In this preferred embodiment, very little if any light needs to be discarded.

FL-RGB fiber laser 10 also has better wall-plug efficiency than traditional white-light-based RGB sources because is generates less heat at a given optical power level. The laser diodes used to pump the fiber lasers and amplifiers in staged fiber laser 16 have very good wall-plug efficiency. Also, the doped fiber sections F1 have very good conversion efficiency in converting 976 nm pump light into 1036 nm NIR light because these two wavelengths are close together. This property is often referred to a "low quantum defect." Further, since lasers are, by definition, bright sources of light, very little light is lost compared to white-light-based RGB sources, which radiate light over a large solid angle and require complex optics to capture usable light and dispose of the unwanted wavelengths.

The flexibility in setting NIR wavelength $\lambda_N$ in NIR beam BN emitted from fiber laser 16, in combination with the flexibility in setting the conversion wavelengths in first NLO unit 22-1, allows for the RGB wavelengths $\lambda_R$, $\lambda_G$ and $\lambda_B$ to be tuned. This provides for a wide range of possible colors, i.e., it enables a thorough coverage of the CIE Chromaticity Diagram while simultaneously generating relative power levels well-matched to the human eye's sensitivity. This allows for a color display having excellent color depth and quality. Also, given typical conversion efficiencies, because the relative power levels of each color can be matched to the eye's sensitivity, very little power is wasted in achieving a proper tint.

FL-RGB Color Display

Figure 7:
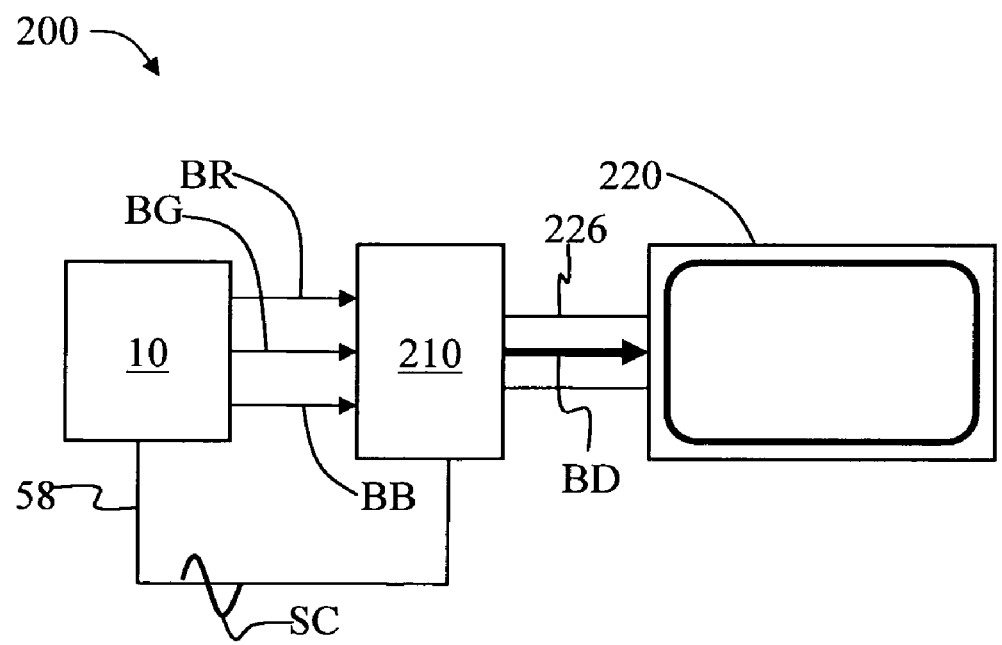
FIG. 7 is a schematic diagram of an example embodiment of a color display that utilizes the FL-RGB source of the present invention.

FIG. 7 is a schematic diagram of a generalized color display 200 that utilizes the FL-RGB source 10 of the present invention. Display 200 includes a display optical system 210 optically coupled to FL-RGB source 10 so that it can receive red, green and blue light beams BR, BG and BB. Display optical system 210 is configured to multiplex, combine or otherwise process red, green and blue light beams BR, BG and BB and provide a display light beam BD to a display screen 220 optically coupled to the multiplexing optical system via an optical link 226 (which may be a free-space optical link). Display screen 220 is adapted to form a display image from display light beam BD.

In an example embodiment, display optical system 210 includes at least one image processing element, such as a digital mirror device (DMD) chip, an LCD chip, and an LCD display. In an example embodiment, display optical system 210 includes a number of optical elements known for use in optical displays, such as one or more dichroic mirrors, one or more beam splitters, one or more prisms, and one or more projection lenses.

It will be apparent to those skilled in the art that various modifications and variations can be made to the present invention without departing from the spirit and scope of the invention. It is thus intended that the present invention cover the modifications and variations of this invention provided they come within the scope of the appended claims and their equivalents.

What is claimed is:

1. A red-green-blue (RGB) light source, comprising:
   an optical fiber laser configured to emit a near-infrared (NIR) light beam having a single NIR wavelength; and
   a wavelength conversion system optically coupled to the optical fiber laser and having three or fewer non-linear optical (NLO) crystals, wherein the wavelength conversion system is configured to receive the single-wavelength NIR light beam and create therefrom red-, green- and blue-wavelength light beams BR, BG and BB using only light originating from the single-wavelength NIR light beam.

2. The RGB light source of claim 1, wherein the fiber laser includes:
   a first stage that includes either a single gain-switched semiconductor laser or a single mode-locked fiber laser, wherein said first stage generates an output beam having light pulses with the single NIR wavelength; and one or more additional stages optically coupled in sequence to the first stage and that include a optical fiber amplifier configured to amplify the single-wavelength NIR light pulses in said first stage output beam.

3. The RGB light source of claim 2, wherein
the first stage output beam NIR wavelength is about 1036 nm; and
the one or more additional stages include a second stage and a third stage, wherein the second and third stages include respective gain-doped optical fiber sections pumped with pump light of about 976 nm.

4. The RGB light source of claim 3, wherein the third stage includes an optical system configured to receive and focus divergent NIR light from the optical fiber section in the third stage.

5. The RGB light source of claim 2, wherein at least one of the stages includes first and second pump light sources having different polarizations.

6. The RGB light source of claim 2, wherein at least one of the stages includes a double-clad gain-doped optical fiber section.

7. The RGB light source of claim 1, wherein the wavelength conversion system comprises:
a first NLO unit configured to perform second harmonic generation (SHG) on the single-wavelength NIR beam and form therefrom the green-wavelength light beam BG;
a second NLO unit configured to receive at least a portion of light beam BG and form therefrom the red-wavelength light beam BR and a mid-infrared (MIR) wavelength light beam BM; and
a third NLO unit configured to receive at least a portion of light beam BM and at least a portion of light beam BG and form therefrom the blue-wavelength light beam BB.

8. The RGB light source of claim 7, wherein:
the second NLO unit includes an optical parametric oscillator (OPO) resonant on the MIR wavelength.

9. The RGB light source of claim 1, wherein the wavelength conversion unit consists of a single optical parametric oscillator (OPO) that includes a periodically poled crystal arranged between input and output end-mirrors, wherein the crystal has a poling pattern that, in combination with the end-mirrors, results in the output of the red-, green- and blue-wavelength light beams BR, BG and BB.

10. The RGB light source of claim 1, wherein the wavelength conversion unit comprises:
a first NLO unit configured to perform second harmonic generation (SHG) on the single-wavelength NIR beam and form therefrom the green-wavelength light beam BG; and
a second NLO unit configured to receive at least a portion of light beam BG and perform optical parametric oscillation (OPO) thereon to form the red-wavelength light beam BR and a mid-infrared (MIR) light beam BM, and also perform sum-frequency mixing (SFM) on a portion of the red light beam BR and at least a portion of the MIR light beam BM to form the blue light beam BB.

11. A color display apparatus, comprising:
the RGB light source of claim 1;
an optical system adapted to receive and process the red-, green- and blue-wavelength light beams from the RGB light source and form therefrom a display light beam; and
a display screen adapted to receive the display light beam and form therefrom a color display image.

12. A red-green-blue (RGB) light source, comprising:
an optical fiber laser configured to output a single-wavelength near-infrared (NIR) output light beam BN; and
a wavelength conversion system optically coupled to the fiber laser and having:
i) a first non-linear-optics (NLO) unit adapted to receive the single-wavelength NIR light beam BN and perform second harmonic generation (SHG) thereon so as to create a green-wavelength light beam BG;
ii) a second NLO unit configured to receive at least a portion of light beam BG and create therefrom a red-wavelength light beam BR and a mid-infrared (MIR) light beam BM; and
iii) a third NLO unit configured to receive at least a portion of light beam BG and at least a portion of light beam BM and form therefrom a blue-wavelength light beam BB.

13. The RGB light source of claim 12, further including an optical system configured relative to the first, second and third NLO units so as to provide an optical path over which only light originating from the single-wavelength NIR output beam BN is used to form the red-, green- and blue-wavelength light beams BR, BG and BB.

14. The RGB light source of claim 12, wherein the second NLO unit includes an optical parametric oscillator configured to resonate on the MIR wavelength so as to produce the MIR light beam BM.

15. The RGB light source of claim 12, wherein the fiber laser comprises a first stage that serves as a master oscillator that generates an initial single-wavelength NIR light beam, and further including at least one additional stage that includes an optical fiber amplifier adapted to amplify the initial single-wavelength NIR light beam to generate the single-wavelength output NIR light beam BN.

16. A color display apparatus, comprising:
the RGB light source of claim 12;
an optical system adapted to receive and process the red-, green- and blue-wavelength light beams from the RGB light source and form therefrom a display light beam; and
a display screen adapted to receive the display light beam and form therefrom a color display image.

17. A method of producing red wavelength, green wavelength and blue wavelength light beams BR, BG and BB, comprising:
forming a near-infrared (NIR) single-wavelength light beam BN using an optical fiber laser; and
converting light from the single-wavelength NIR light beam to the red, green and blue light beams BR, BG and BB using no more than three non-linear crystals and using only light originating from the single-wavelength NIR light beam BN.

18. The method of claim 17, wherein forming the single-wavelength NIR light beam BN includes:
generating an initial single-wavelength NIR light beam in a first stage of the optical fiber laser using a single NIR-wavelength laser; and
amplifying the initial single-wavelength NIR light beam using at least one subsequent amplifying stage of the optical fiber laser.

19. The method of claim 17, wherein said converting includes passing the single-wavelength NIR light beam through a single optical parametric oscillator having a periodically poled crystal arranged between input and output end-mirrors.

20. The method of claim 17, further including:
forming a display beam from light beams BR, BG and BB; and
providing the display beam to a display screen adapted to form a color display image from the display beam.

* * * * *